A. F. ANDERSON.
WASHING MACHINE.
APPLICATION FILED NOV. 7, 1919.

1,432,229.

Patented Oct. 17, 1922.
5 SHEETS—SHEET 1.

Inventor:
Adolph F. Anderson
By Forée Bain & Hinkle
Atty's.

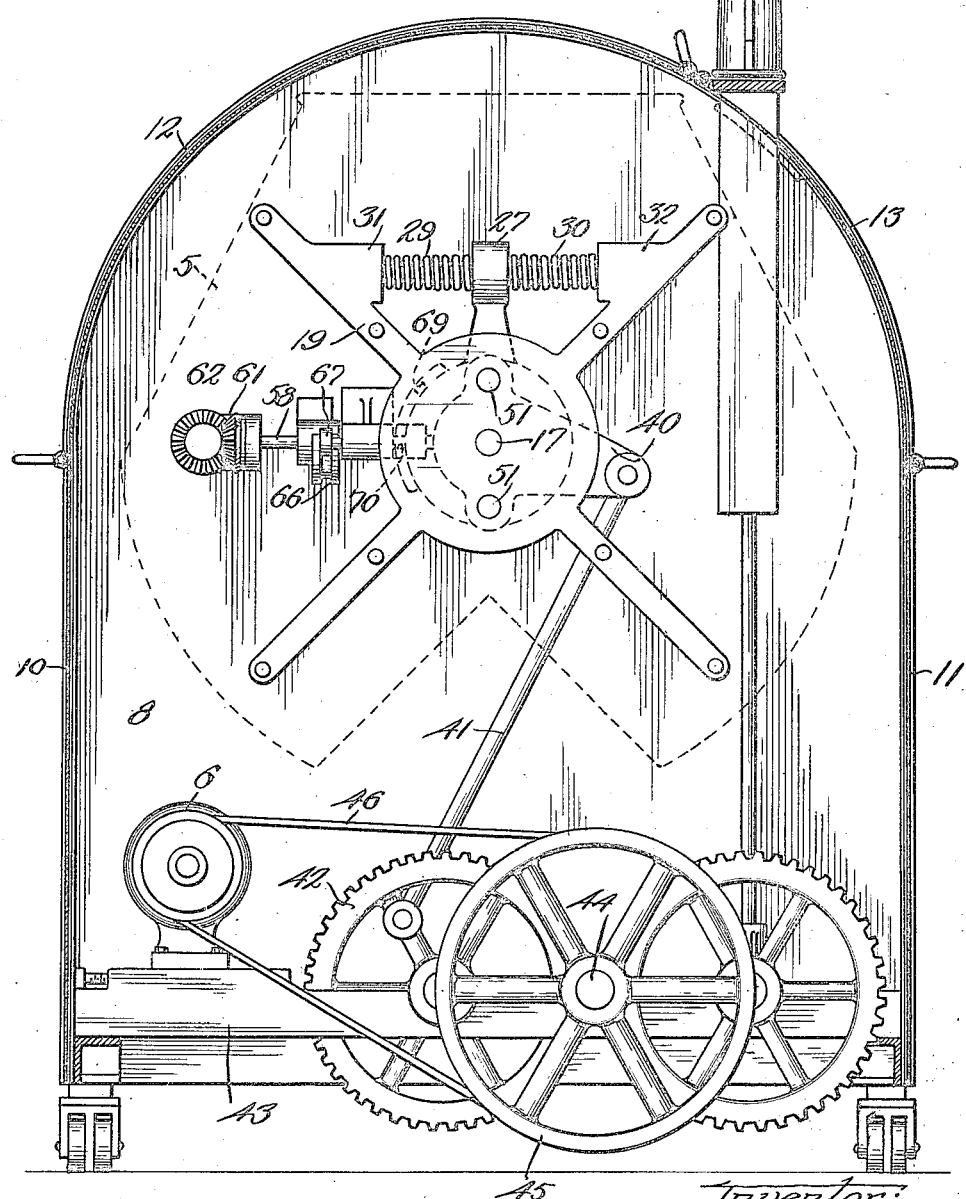

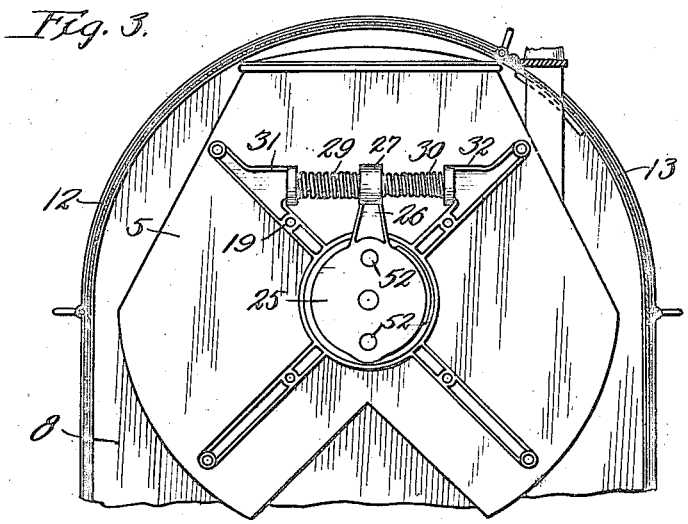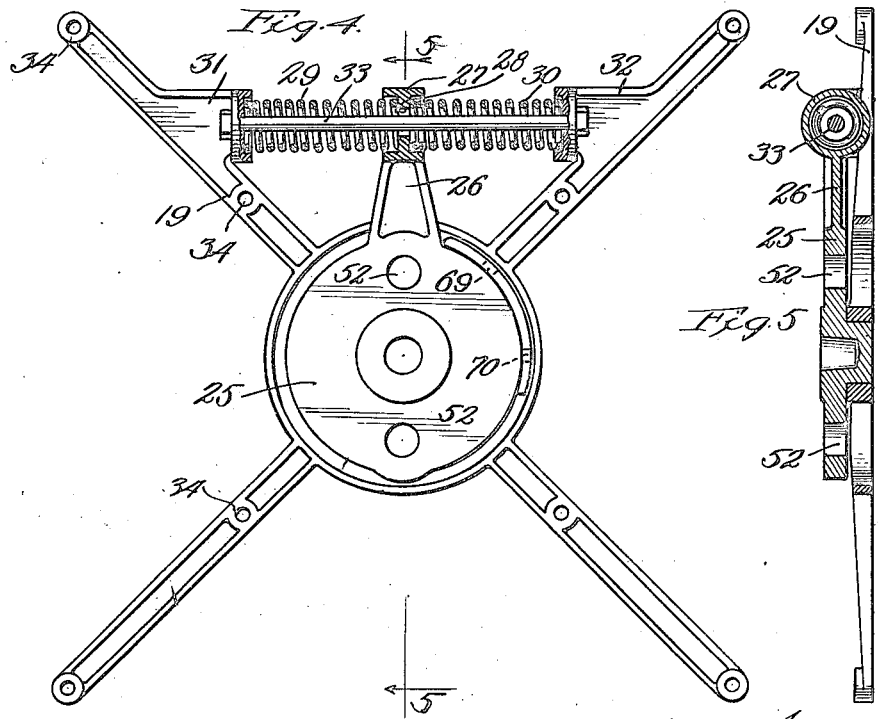

A. F. ANDERSON.
WASHING MACHINE.
APPLICATION FILED NOV. 7, 1919.
1,432,229. Patented Oct. 17, 1922.
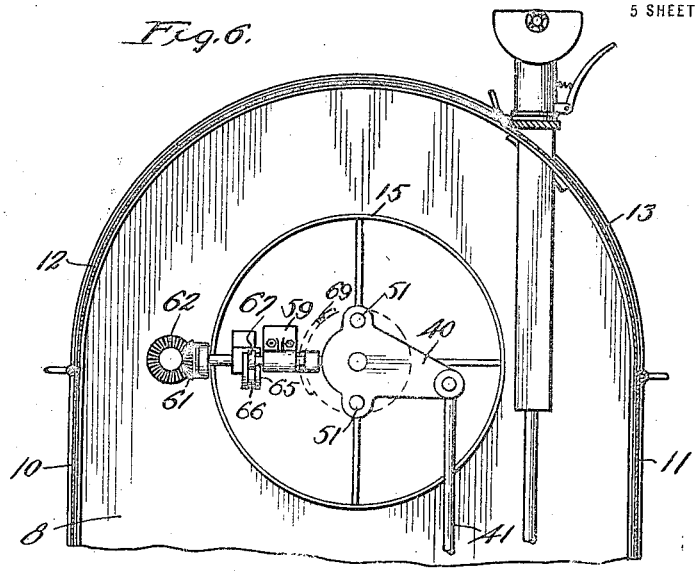
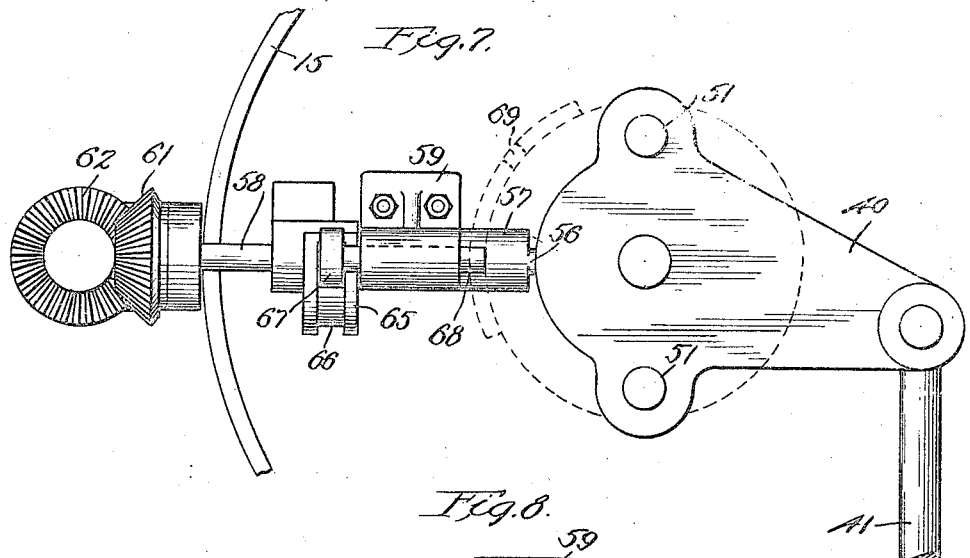
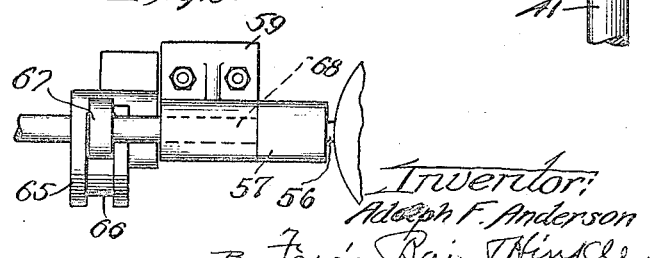
Inventor:
Adolph F. Anderson A. F. ANDERSON.
WASHING MACHINE.
APPLICATION FILED NOV. 7, 1919.
1,432,229.
Patented Oct. 17, 1922.
5 SHEETS—SHEET 5.
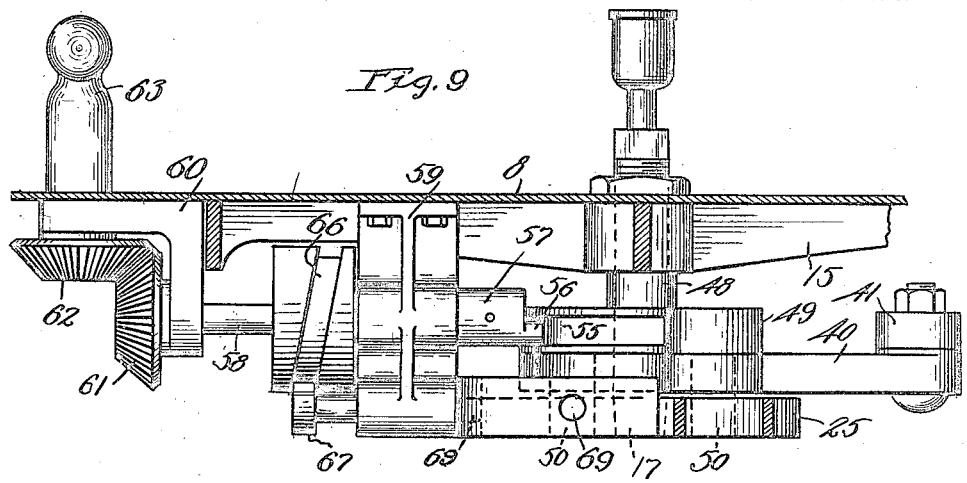
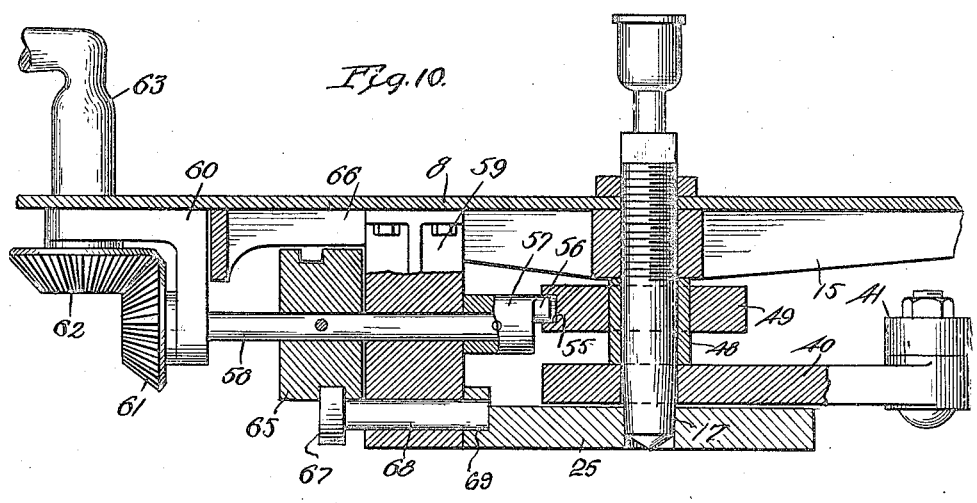
Inventor:
Adolph F. Anderson
By Jones Bain & Hinkle
Attys.

Patented Oct. 17, 1922.

1,432,229

UNITED STATES PATENT OFFICE.

ADOLPH F. ANDERSON, OF CHICAGO, ILLINOIS, ASSIGNOR TO APEX APPLIANCE COMPANY, OF CHICAGO, ILLINOIS, A CORPORATION OF ILLINOIS.

WASHING MACHINE.

Application filed November 7, 1919. Serial No. 336,283.

*To all whom it may concern:*

Be it known that I, ADOLPH F. ANDERSON, a citizen of the United States, residing at Chicago, in the county of Cook and State of Illinois, have invented certain new and useful Improvements in Washing Machines, of which the following is a specification.

This invention relates to washing machines.

More particularly it relates to power driven washing machines.

One of the objects of the invention is to provide an improved washing machine.

Another object is to provide an improved mechanism for operating the tub of a washing machine.

Another object is to provide improved mechanism for controlling the operation of the tub.

Another object is to provide improved mechanism for starting and stopping the oscillation of the tub and insuring that the tub stops in proper position.

Other objects and advantages will appear from the specification and claims.

An embodiment of the invention is illustrated in the accompanying drawings.

In the drawings—

Fig. 2 is a section on the line 2—2 of Fig. 1.

Fig. 3 is a section on the line 3—3 of Fig. 1.

Fig. 4 is a front end elevation of one of the tub suspensions.

Fig. 5 is a section on the line 5—5 of Fig. 4.

Fig. 6 is a section on the line 6—6 of Fig. 1, and

Figure 1:
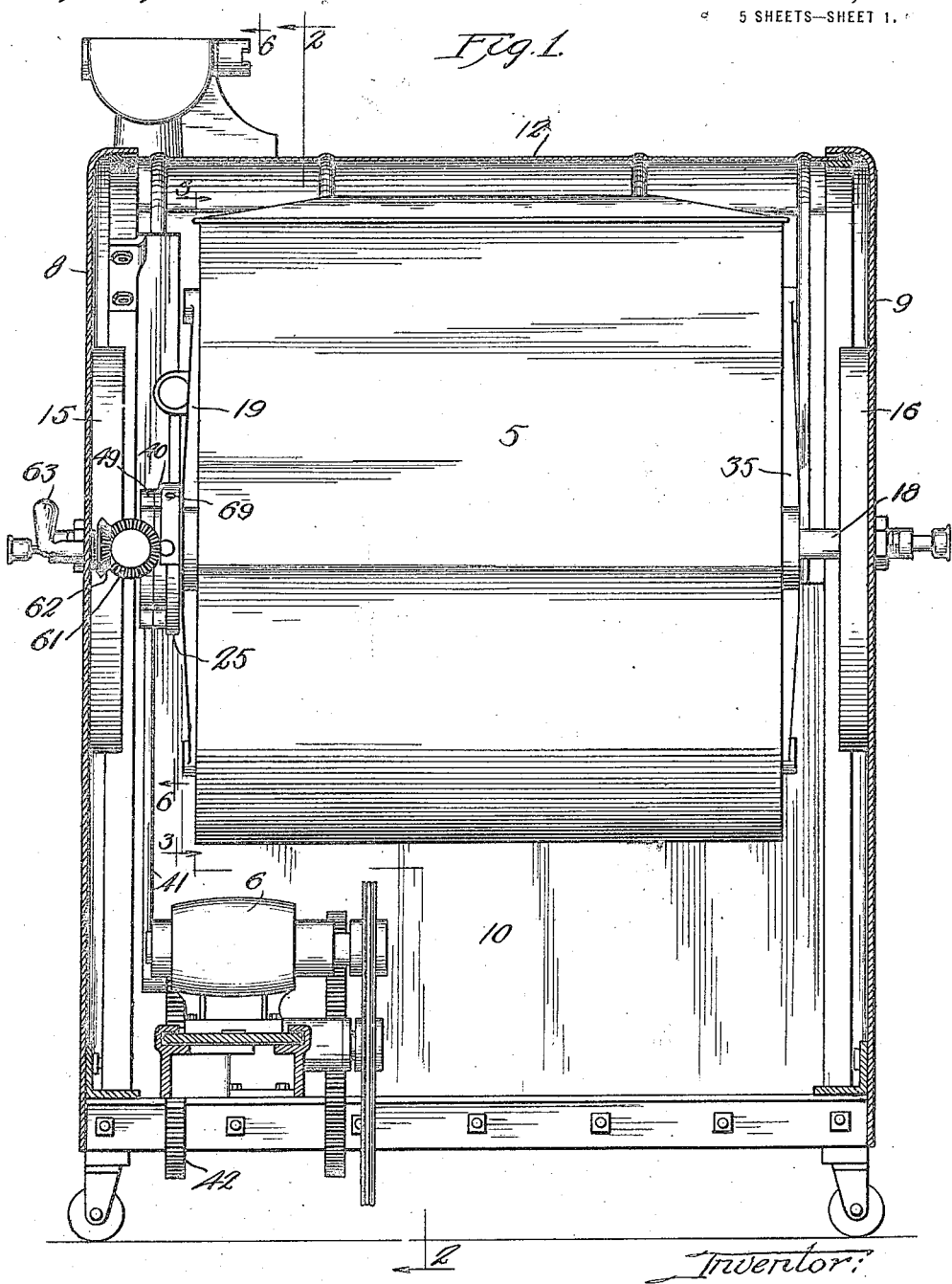
Fig. 1 is a transverse section through the washing machine housing.

Figs. 7 to 10 inclusive are views of details of the driving and control mechanism.

The washing machine comprises in general a tub 5, driven by operating mechanism including an electric motor 6. The tub and operating mechanism may be completely enclosed by a housing.

The housing shown is described in detail and claimed in my copending application, Serial No. 336,362 executed on even date herewith.

In general the housing is formed of two rigid end walls 8 and 9, two slidably opening side walls 10 and 11 and a top, having a slidably opening cover 12 and a fixed section 13. The side and end walls and top are supported upon a base formed from angle irons.

Secured to the respective end walls 8 and 9 are spiders 15 and 16, through the hubs of which project a pair of trunnions 17 and 18, upon which the tub is supported. Trunnion 17 projects into a bearing in the hub of a spider 19, rigidly fastened to one end of the tub.

Rotatably journaled upon trunnion 17 is a crank disc 25 having an arm or crank 26 projecting upwardly therefrom. Arm 26 is provided at its outer end with a boss 27 having a central opening 28 therethrough. The opposite sides of boss 27 are chambered to provide retaining seats for a pair of coiled springs 29 and 30. The two upper arms of spider 19 are provided with bosses 31 and 32, which are similarly chambered to receive the opposite ends of springs 29 and 30. A bolt 33 passes through bosses 31 and 32, the spring, and the central opening in boss 27. This bolt serves to maintain springs 29 and 30 in proper position.

The spider may be retained in position on the tub by screws or bolts passing through openings 34.

The opposite side of the tub is provided with a somewhat similar spider 35. No crank disc or springs are needed on this side. Trunnion 18 projects into a bearing formed in the hub of spider 35.

The tub is thus rotatably suspended from and between the housing end walls. It may be oscillated by arm 26 acting through springs 29 and 30. These springs provide a resilient connection between crank disc 25 and the tub so that when the crank disc is oscillated, sudden and violent movement is not imparted to the tub and the inertia of the tub does not seriously affect the power operating mechanism.

Crank disc 25 is oscillated by motor 6. Pivotally mounted upon trunnion 17 is a crank 40 which is connected by a connecting rod 41 to a gear wheel 42. Gear wheel 42 is journaled in a bearing in a bed plate 43 and its teeth mesh with a pinion on a shaft 44. Shaft 44 has a pulley 45 rigidly secured thereto. A belt 46 interconnects pulley 45 and a suitable pulley on the shaft of motor 6. The motor thus causes the oscillation of crank 40.

Loosely mounted upon trunnion 17 is a spacing sleeve or collar 48 (see particularly Fig. 10). Loosely encircling sleeve 48 so as to be longitudinally movable thereon is a driving clutch 49. Clutch 49 is provided with a pair of pins 50 rigidly secured thereto. Pins 50 project into holes 51 in crank 40 when clutch 49 is in non-driving position, as shown in Fig. 10, and through holes 51 into corresponding holes 52 in crank disc 25 when clutch 49 is in driving position, as shown in Fig. 9. Pins 50 always project into crank 40, so that clutch 49 and the pins are oscillated whenever the motor is in operation. When the clutch is in driving position the pins also project into the openings in crank disc 25 and the tub is accordingly oscillated with crank 40 and clutch 49.

The clutch is thrown into and out of driving position by a handle on the outside of the housing. Clutch 49 is provided through a portion of its circumference with a groove 55. Into grooves 55 projects a pin 56 which extends eccentrically from a collar 57. Collar 57 is rigidly secured to a shaft 58 journaled in bearings 59 and 60 secured to end wall 8. Shaft 58 has a beveled pinion 61 keyed or otherwise rigidly secured thereto. Pinion 61 meshes with a bevel pinion 62 carried by a shaft also journaled in bearings 60. This shaft is provided with or bent into the form of a handle 63, which is operable from the outside of the housing. When shaft 58 is turned by handle 63 the eccentric projection 56 slides clutch 49 along sleeve 48 into locking or non-locking position. The pin and slot connection between projection 56 and clutch 49 allows the clutch to be freely oscillated at all times and to be thrown into and out of driving position while the motor is in operation. By providing a movable clutch member, crank 40 may be made axially immovable so that connecting rod 41 is retained substantially in the same plane. This reduces the liability of bending the connecting rod and allows the use of connections having tighter fits and consequently less lost motion and other disadvantages.

To insure that the opening in the top of the tub is in proper position when the oscillation is stopped and to lock the tub in this position, a latch is operated simultaneously with the operation of the driving clutch. Rigidly secured to shaft 58 is a collar 65. Collar 65 has a spirally grooved cam 66 secured to its periphery. Into the groove of this cam projects a roller head 67 of a bolt 68. Bolt 68 is slidably carried by bearing 59 and when advanced may project into one or the other of two holes 69 and 70 located in the circumference of crank disc 25.

When force is exerted on handle 63 to move the same to cause the disengagement of the driving clutch, the spiraled groove of cam 66 tends to force bolt 68 outwardly. Bolt 68 engaging the surface of crank disc 25, prevents the clutch from being thrown until one or the other of holes 69 and 70 comes opposite the bolt. The pressure on the handle then throws the clutch to non-driving position and advances bolt 68 to locking position. The oscillation of the tub is thus stopped and the tub is locked with its opening either at the top or slightly tilted toward the front, as desired.

When handle 63 is moved to throw the clutch to driving position, bolt 68 is simultaneously withdrawn. The bolt releases the tub just before the clutch reaches driving position and then the tub is oscillated by the motor.

Having described my invention, what I claim is:—

1. A washing machine having a pivotally mounted tub, a crank disc resiliently connected to said tub to move the same, operating mechanism for oscillating said crank disc, a clutch for connecting and disconnecting said crank disc and mechanism, and a stop acting simultaneously with said clutch and positively arresting the oscillation of the crank disc, whereby the tub is brought to rest in one of several definite positions.

2. A washing machine having a pivotally mounted tub, a crank disc resiliently connected thereto, driving mechanism, a clutch associated with said driving mechanism, a manually operated element adapted to throw said clutch into and out of engagement with said crank disc, said crank disc having a plurality of recesses, a locking member adapted to enter any one of said recesses, and means controlled by said element and adapted to operate said locking member, whereby said tub may be brought to rest in any one of several definite positions.

3. A washing machine having a pivotally mounted tub, a crank disc connected thereto, driving mechanism, a clutch associated with said driving mechanism, a manually operated element adapted to throw said clutch into and out of engagement with said crank disc, means adapted to lock the tub in a definite position, and means controlled by said element and adapted to operate said first mentioned means.

4. A washing machine having a pivotally mounted tub, a crank disc connected thereto, driving mechanism, a clutch associated with said driving mechanism, a manually operated element adapted to throw said clutch into and out of engagement with said crank disc, said crank disc having a plurality of recesses, a locking member adapted to enter any one of said recesses, and means controlled by said element and adapted to operate said locking member, whereby said tub may be locked in any one of several definite positions.

5. A washing machine having a pivotally mounted tub, a crank disc connected thereto, driving mechanism, a clutch associated with said driving mechanism, a manually operated element adapted to throw said clutch into and out of engagement with said crank disc, said crank disc having a plurality of recesses, a locking member adapted to enter any one of said recesses, and a spirally grooved collar associated with said element whereby said locking member may be positioned in any one of said recesses and the tub locked in any one of several definite positions.

6. A washing machine having a pivotally mounted tub, a crank disc resiliently connected thereto, power transmitting mechanism including a crank for oscillating said crank disc, a clutch axially movable on the axis of said tub and for operatively connecting and disconnecting said crank and crank disc, and means including a handle for operating said clutch.

7. A washing machine having a pivotally mounted tub, a crank disc resiliently connected to the tub, power transmitting mechanism for oscillating said crank disc, a clutch for connecting and disconnecting said crank disc and mechanism, a stop adapted to lock the crank disc in any one of several definite positions, and manually operated means adapted by a single operation to move the stop out of engagement with the crank disc and to move the clutch into operative engagement with the crank disc and by a reverse operation of the manually operated means to move the clutch out of engagement with the crank disc and to move the lock into engagement with said crank disc.

8. A washing machine having a pivotally mounted tub, a crank disc connected to the tub, a power transmitting mechanism for oscillating said crank disc, a clutch axially movable on the axis of said tub for connecting and disconnecting said crank disc and mechanism, a stop for locking the disc in any one of several definite positions, and manually operated means adapted by a single operation to simultaneously move the clutch out of engagement with the disc and the stop into engagement with the disc, said clutch being entirely disengaged from said disc before the stop is brought into engagement with said disc.

In testimony whereof I hereunto subscribe my name.

ADOLPH F. ANDERSON.